United States Patent
Stoll et al.

(10) Patent No.: US 9,593,813 B2
(45) Date of Patent: Mar. 14, 2017

(54) ARRANGEMENT COMPRISING A LIGHT EMITTING DIODE

(71) Applicant: OSRAM Opto Semiconductors GmbH, Regensburg (DE)

(72) Inventors: Ion Stoll, Tegernheim (DE); Ulrich Streppel, Regensburg (DE)

(73) Assignee: OSRAM Opto Semiconductors GmbH (DE)

( * ) Notice: Subject to any disclaimer, the term of this patent is extended or adjusted under 35 U.S.C. 154(b) by 226 days.

(21) Appl. No.: 14/255,453

(22) Filed: Apr. 17, 2014

(65) Prior Publication Data

US 2014/0313728 A1  Oct. 23, 2014

(30) Foreign Application Priority Data

Apr. 22, 2013 (DE) ......... 10 2013 207 242

(51) Int. Cl.
| | |
|---|---|
| *F21V 9/00* | (2015.01) |
| *F21K 99/00* | (2016.01) |
| *F21V 7/00* | (2006.01) |
| *F21V 5/04* | (2006.01) |
| *G02B 19/00* | (2006.01) |
| *G02B 3/08* | (2006.01) |
| *F21S 8/04* | (2006.01) |
| *F21Y 101/00* | (2016.01) |

(52) U.S. Cl.
CPC ............. *F21K 9/56* (2013.01); *F21V 5/04* (2013.01); *F21V 7/0025* (2013.01); *G02B 3/08* (2013.01); *G02B 19/0019* (2013.01); *G02B 19/0061* (2013.01); *F21S 8/04* (2013.01); *F21Y 2101/00* (2013.01); *F21Y 2103/10* (2016.08); *F21Y 2115/10* (2016.08)

(58) Field of Classification Search
CPC . F21K 9/56; F21V 7/0025; F21V 5/04; G02B 19/0019; G02B 19/0061; G02B 3/08; G02B 19/0071; G02B 5/1876; F21S 8/04; F21Y 2101/02; F21Y 2103/003
USPC .......................................................... 362/293
See application file for complete search history.

(56) References Cited

U.S. PATENT DOCUMENTS

| | | | | |
|---|---|---|---|---|
| 2003/0230751 | A1* | 12/2003 | Harada | H01L 33/44 257/80 |
| 2006/0034084 | A1* | 2/2006 | Matsuura | H01L 33/507 362/293 |
| 2006/0138440 | A1* | 6/2006 | Jyo | G09F 9/33 257/98 |
| 2010/0284194 | A1* | 11/2010 | Miyashita | F21V 5/04 362/311.09 |

(Continued)

*Primary Examiner* — Ali Alavi
(74) *Attorney, Agent, or Firm* — DLA Piper LLP (US)

(57) ABSTRACT

An arrangement for generating light including a light emitting diode, including a conversion element, is proposed, wherein the conversion element is arranged above the light emitting diode and is provided for at least partly changing the wavelength of the electromagnetic radiation emitted by the light emitting diode, wherein the conversion element is designed in such a way that the light impinging on the conversion element from outside in a first color range is reflected, wherein the conversion element is surrounded by an edge region, wherein the edge region is designed in such a way that light impinging on the edge region in a second color range is reflected, wherein the second color range at least partly has a color range complementary to the first color range.

21 Claims, 15 Drawing Sheets

(56) References Cited

U.S. PATENT DOCUMENTS

Figure 1:
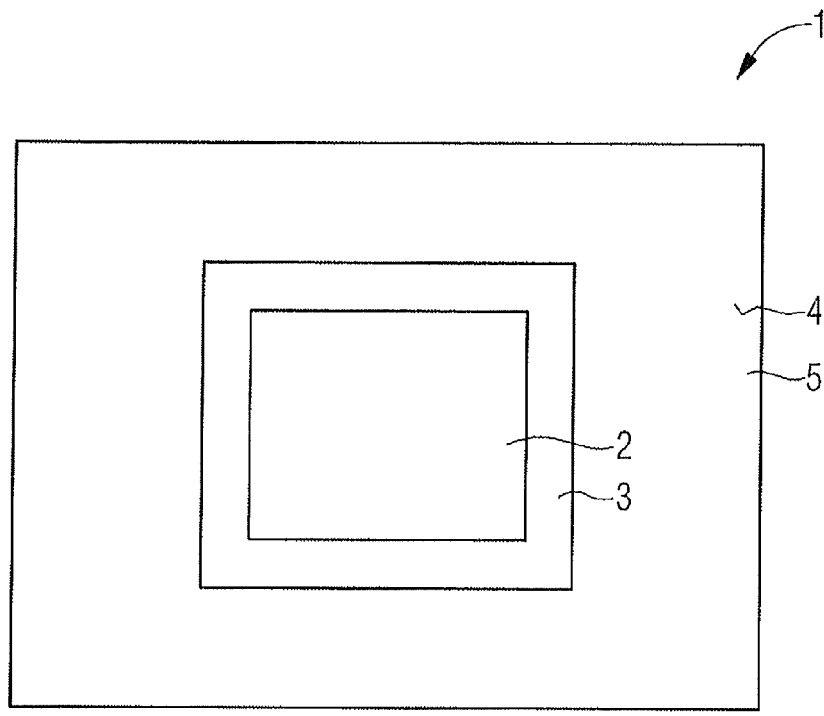

| | | | |
|---|---|---|---|
| 2012/0001204 A1* | 1/2012 | Jagt | H01L 33/504 257/88 |
| 2013/0010454 A1* | 1/2013 | Takayama | F21V 5/045 362/84 |
| 2014/0355273 A1* | 12/2014 | Saito | F21V 5/04 362/309 |

* cited by examiner

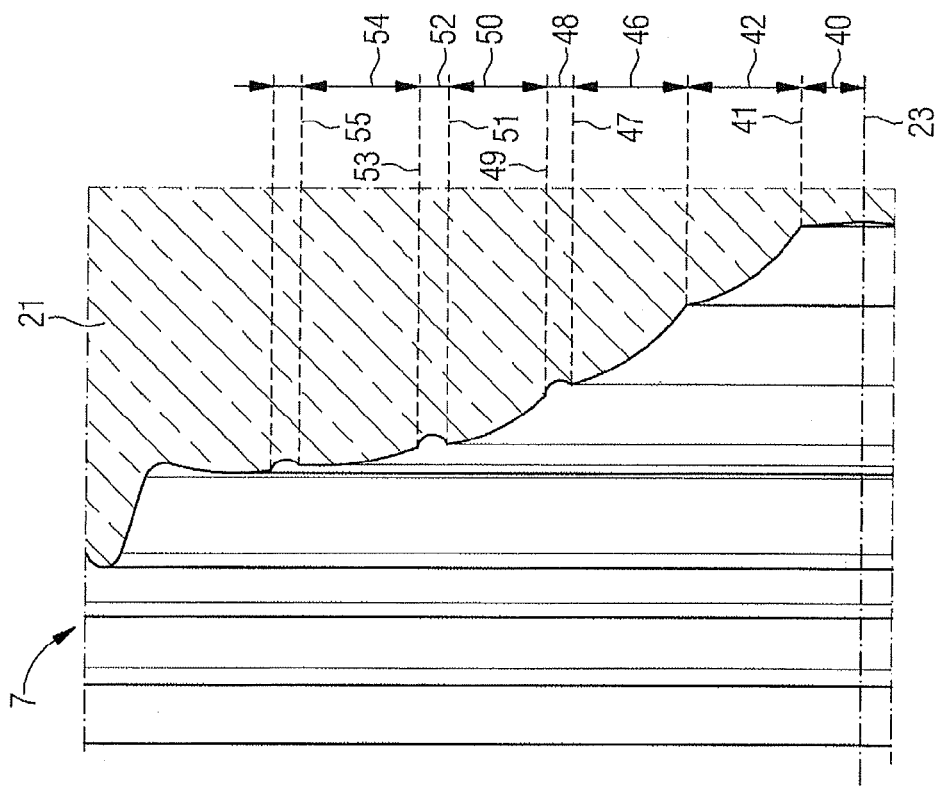
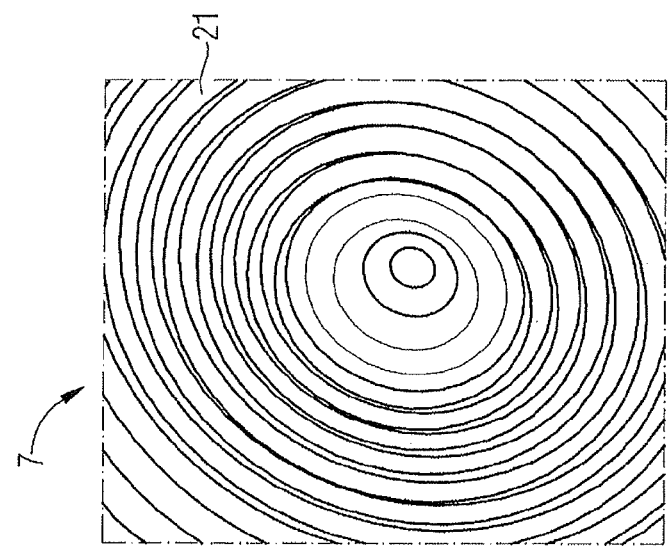

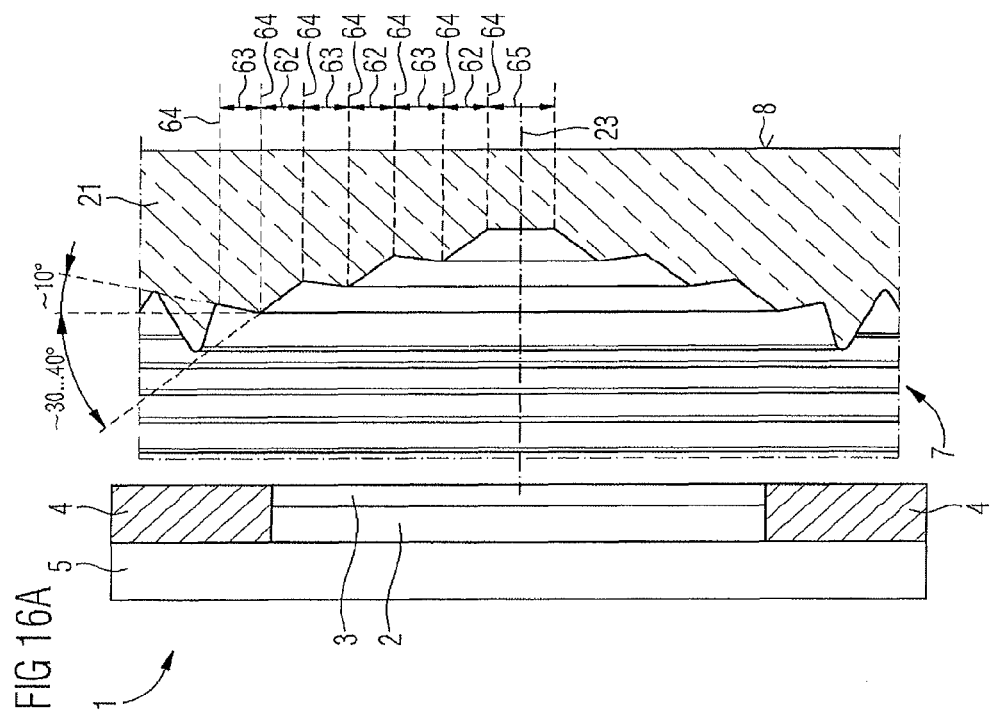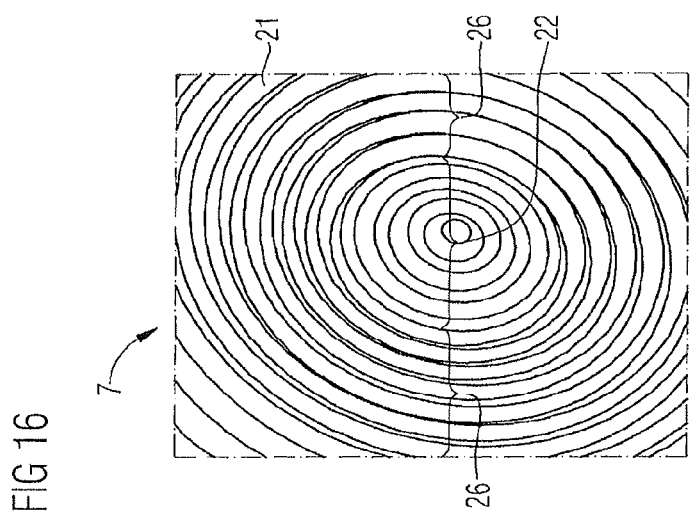

ARRANGEMENT COMPRISING A LIGHT EMITTING DIODE

TECHNICAL FIELD

This disclosure relates to an arrangement for generating light comprising a light emitting diode as claimed in patent claims 1, 20 and 21.

This patent application claims the priority of the German patent application DE 10 2013 207 242.2, the disclosure content of which is hereby incorporated by reference.

PRIOR ART

The prior art discloses an arrangement for generating light comprising a light emitting diode wherein the light emitting diode is surrounded by an edge region. Moreover, a conversion element is provided on the diode, said conversion element shifting the wavelength of the electromagnetic radiation emitted by the diode. For this purpose, the conversion element comprises dyes or pigments which reflect incident light from outside in a specific color. The color may be perceived as disturbing by an observer depending on the color with which the conversion element reflects the incident light. By way of example, the arrangement can be provided in a cellular phone and the color of the conversion element may disturb the visual impression of the cellular phone.

In the prior art it is already known to provide on a conversion element a white scattering or reflector layer, which is formed as titanium oxide, for example, in order to bring about a white impression of the arrangement. The scattering or reflector layer brings about an additional scattering that brings about a loss of brightness for the arrangement. Moreover, applying the scattering or reflector material is relatively complex and beset by faults.

Moreover, the arrangement can be provided as an illuminant for a room, for example, and the visual impression generated by the conversion element may be perceived as disturbing.

There is a need to provide an arrangement for generating light comprising a light emitting diode with a conversion element, wherein the visual impression of the arrangement is independent of the color reflected by the conversion element.

SUMMARY

An arrangement for generating light comprising a light emitting diode is proposed, comprising a conversion element, wherein the conversion element is provided for at least partly changing the wavelength of the electromagnetic radiation emitted by the light emitting diode, wherein the conversion element is designed in such a way that light impinging on the conversion element from outside in a first color range is reflected, wherein the conversion element is at least partly surrounded by an edge region, wherein the edge region is designed in such a way that light impinging on the edge region in a second color range is reflected, wherein the second color range at least partly has a color range complementary to the first color range.

An arrangement for generating light comprising a light emitting diode is proposed, comprising a conversion element, wherein the conversion element is provided for at least partly changing the wavelength of the electromagnetic radiation emitted by the light emitting diode, wherein the conversion element is designed in such a way that light impinging on the conversion element from outside in a first color range is reflected, wherein the conversion element is at least partly surrounded by an edge region, wherein the edge region is designed in such a way that light impinging on the edge region in a second color range is reflected, wherein the second color range at least partly has a color range complementary to the first color range, wherein an area of the conversion element and an area of the edge region and/or a reflectivity of the conversion element and a reflectivity of the edge region and/or the first and second color ranges are designed in such a way that the light reflected by the conversion element and by the edge region constitutes a white color range.

Furthermore, an arrangement for generating light comprising a light emitting diode is proposed, comprising a conversion element, wherein the conversion element is provided for at least partly changing the wavelength of the electromagnetic radiation emitted by the light emitting diode, wherein the conversion element is designed in such a way that light impinging on the conversion element from outside in a first color range is reflected, wherein the conversion element is at least partly surrounded by an edge region, wherein the edge region is designed in such a way that light impinging on the edge region in a second color range is reflected, wherein the second color range at least partly has a color range complementary to the first color range, wherein a lens is provided above the conversion element, wherein the lens is designed in such a way that the light reflected by the conversion element and by the edge region is mixed.

Figure 2:
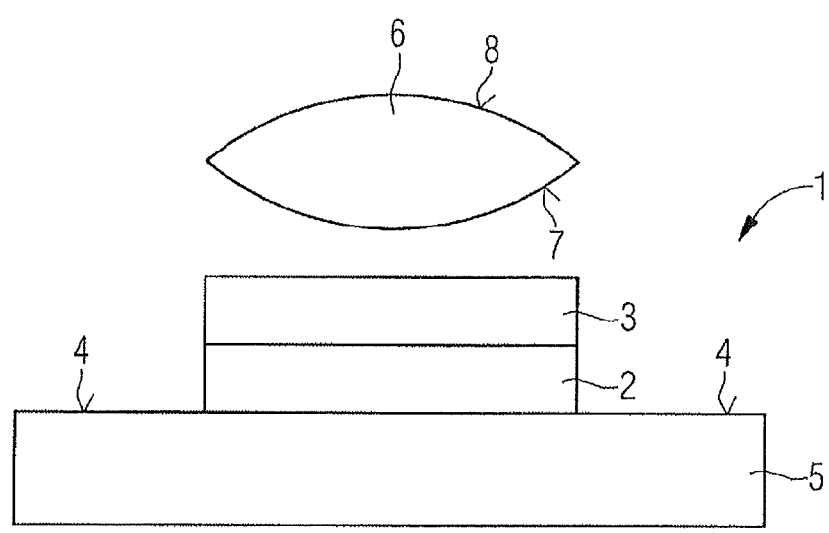
Figure 3:
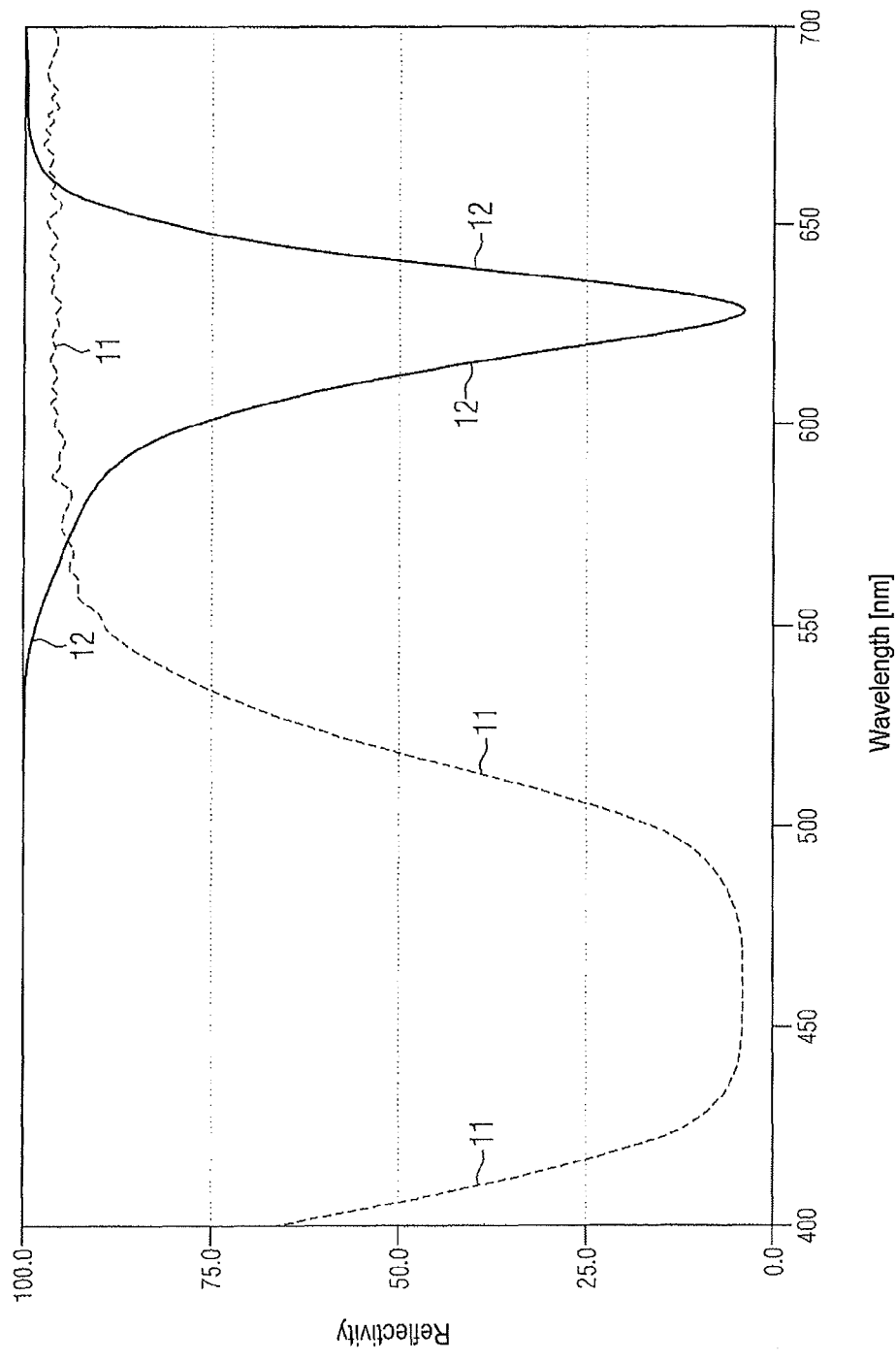
Figure 4:
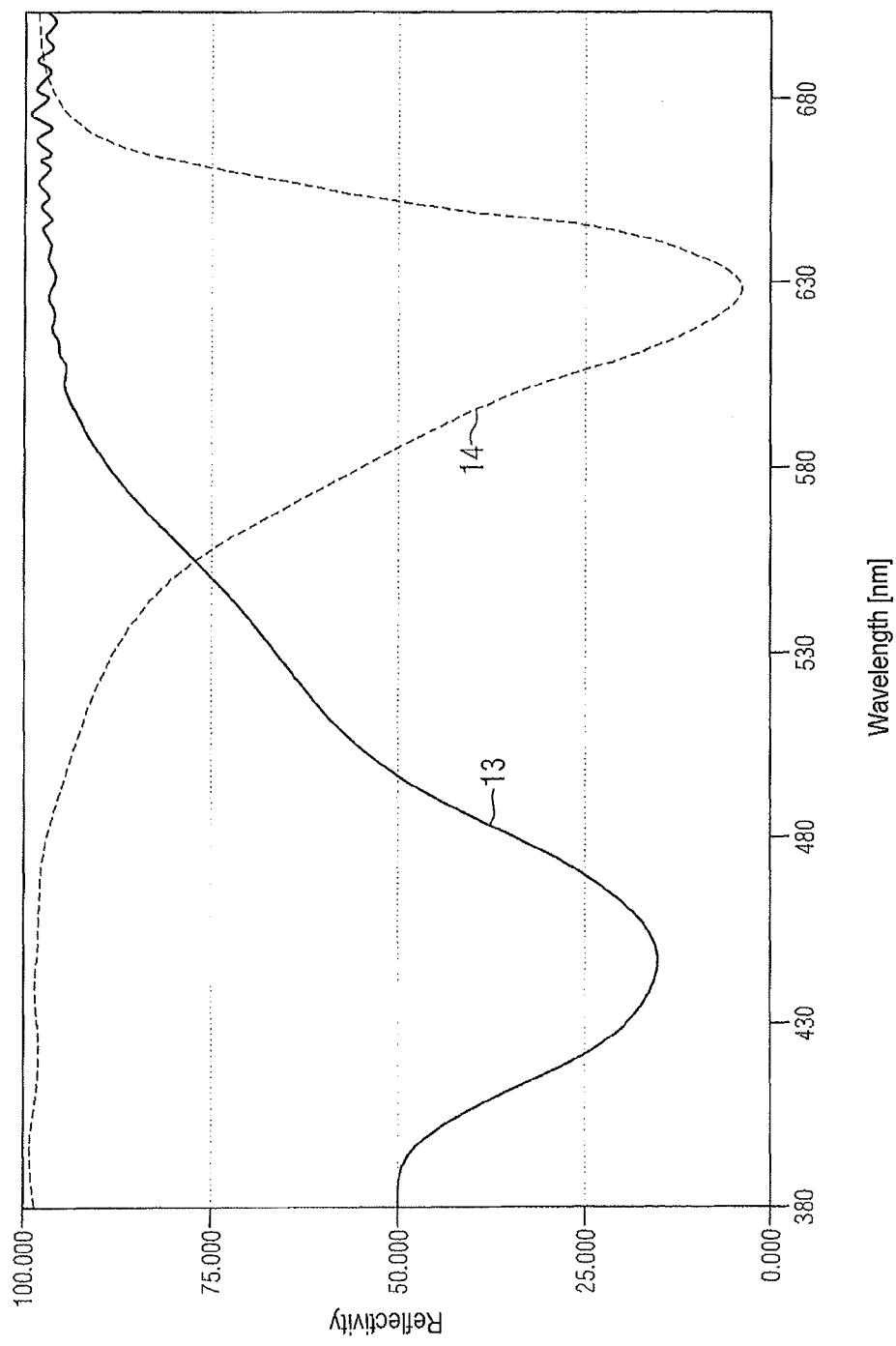
Figure 5:
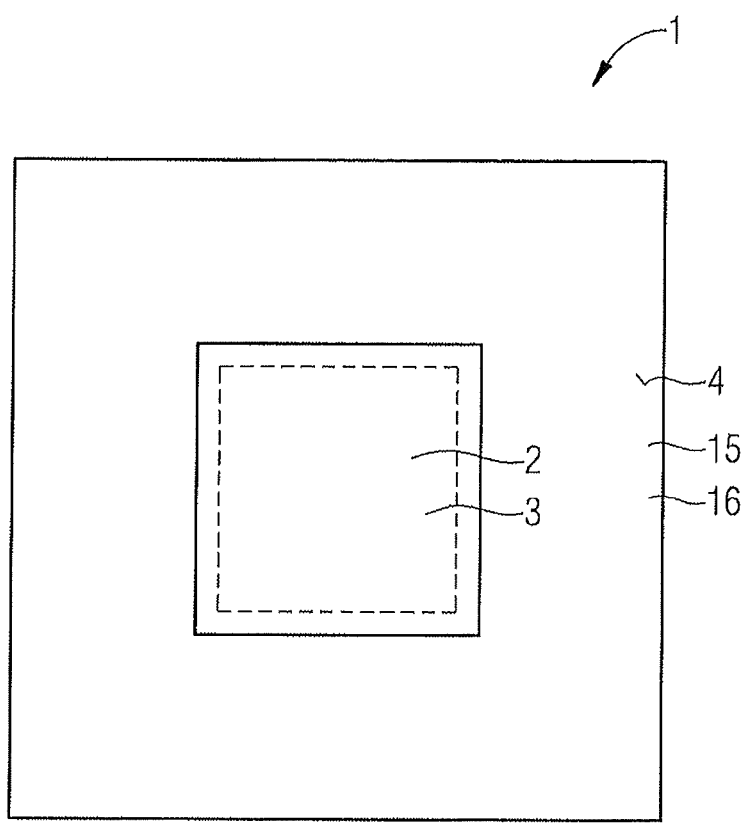
Figure 6:
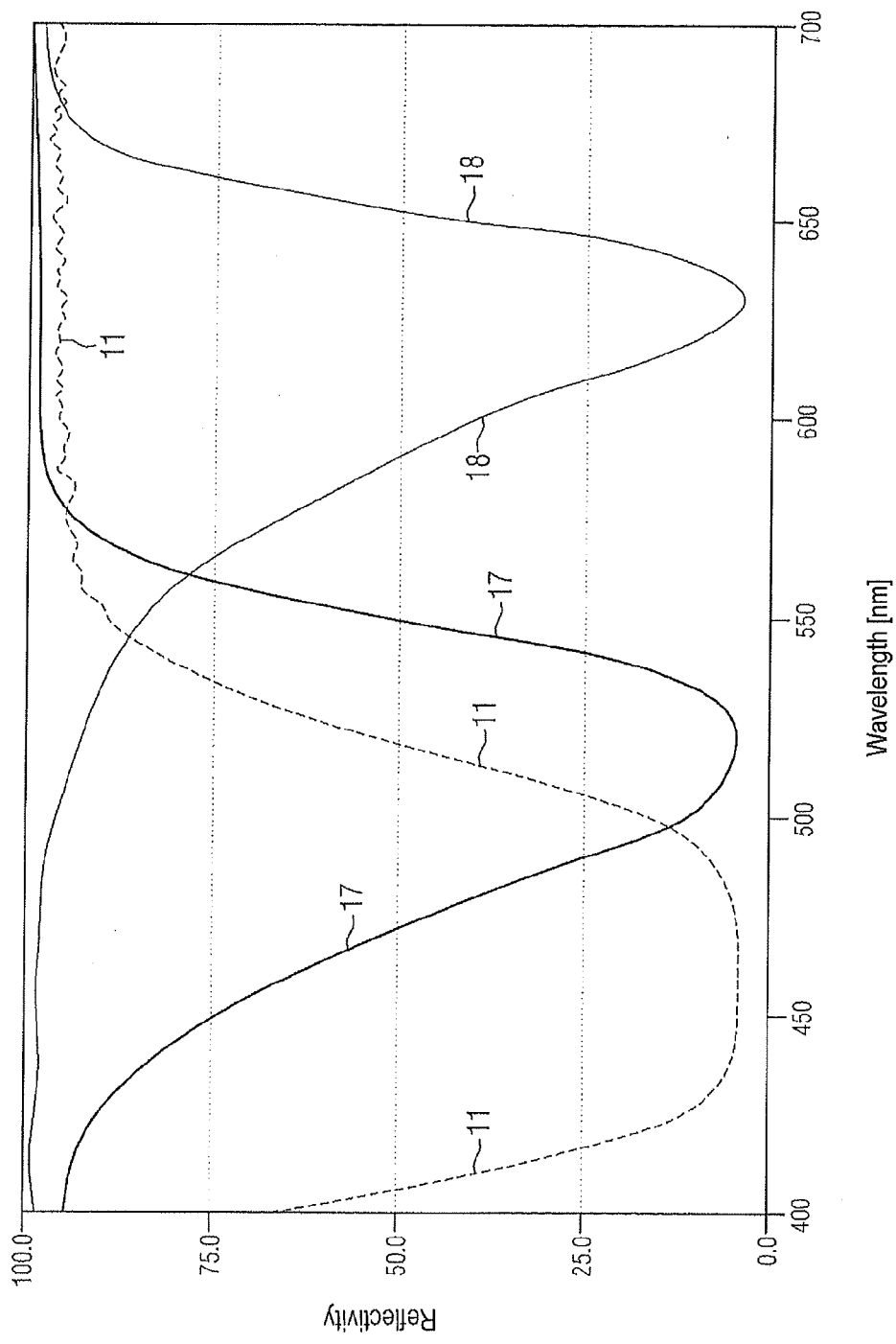
Figure 7:
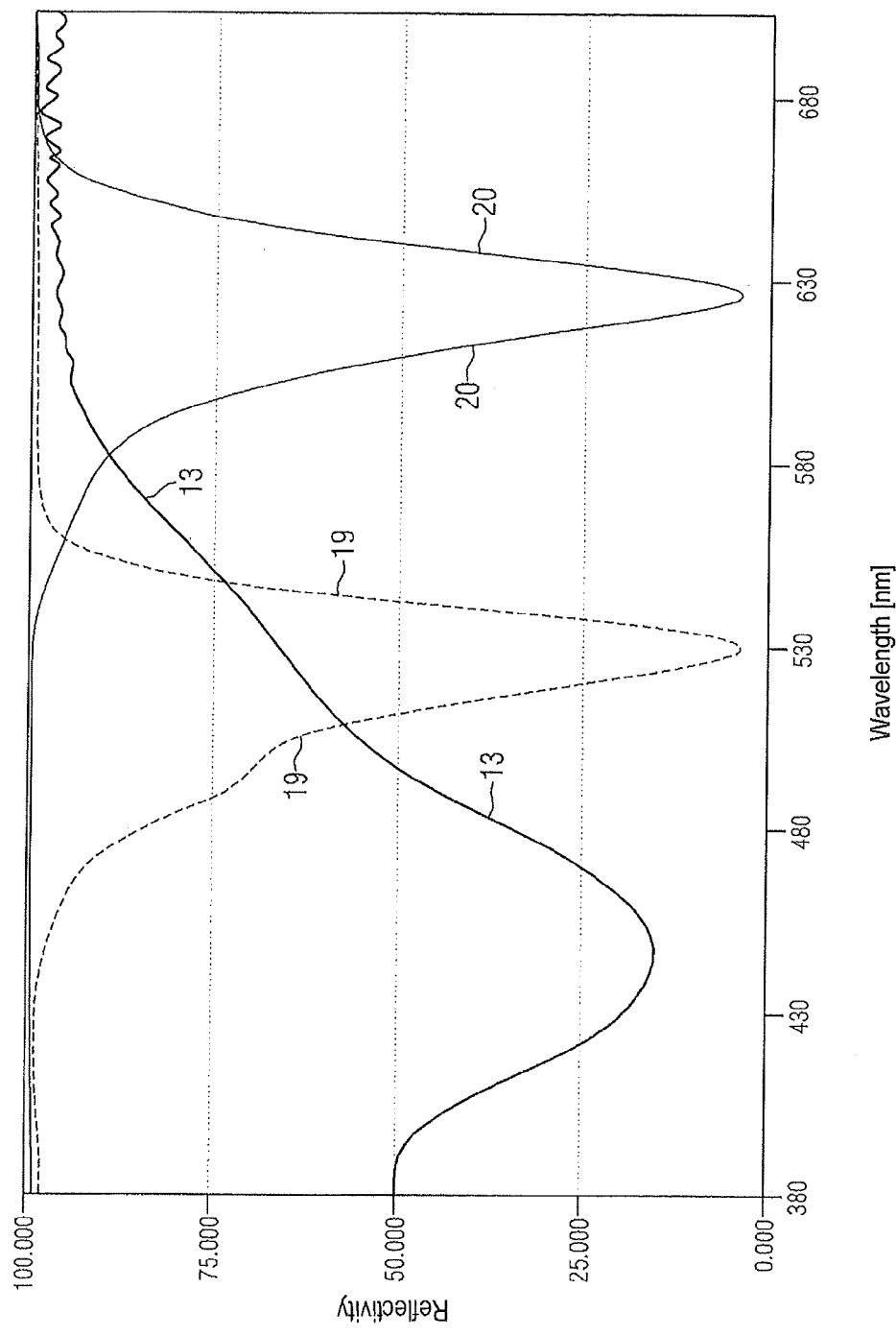
Figure 8:
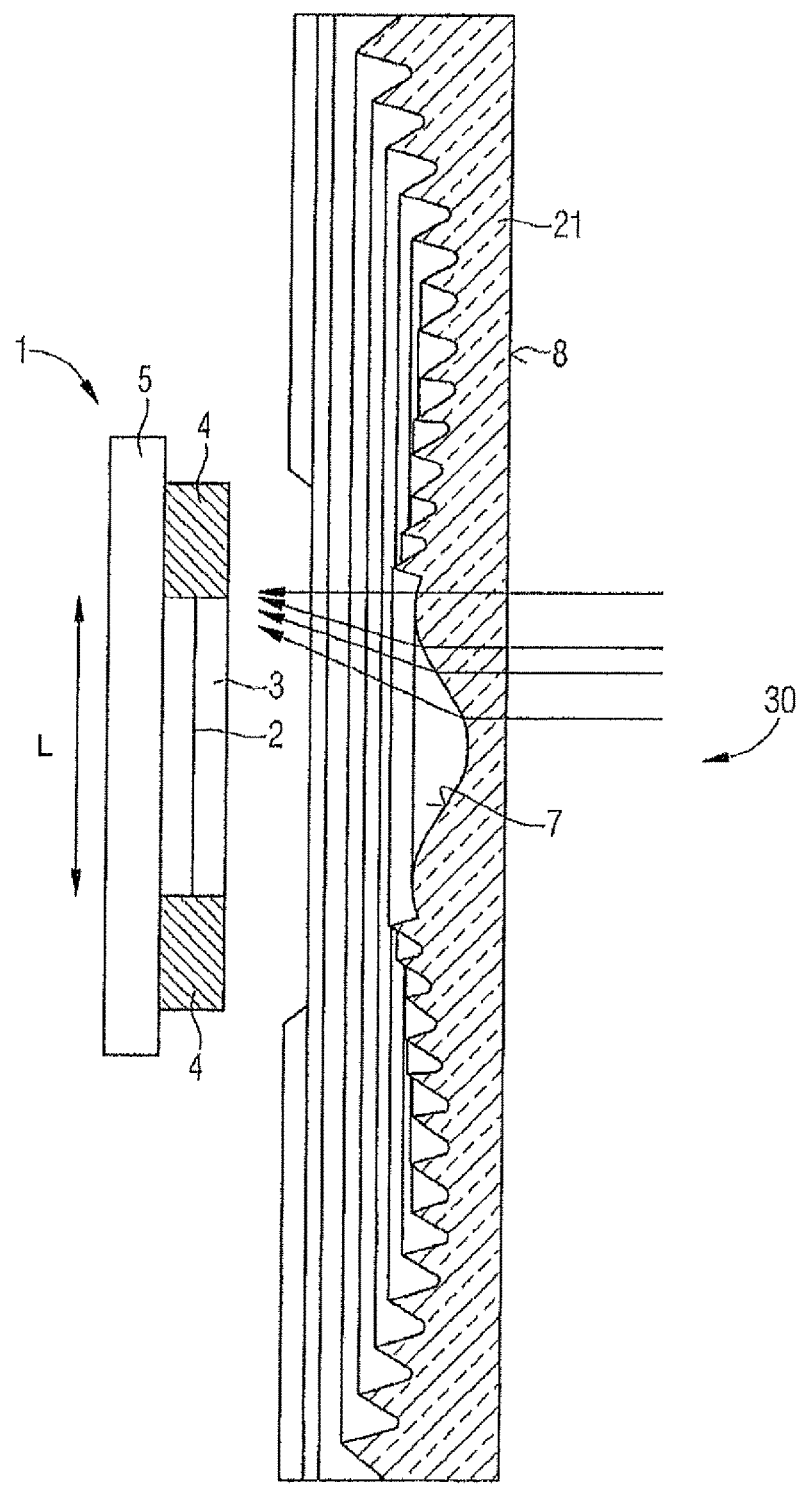
Figure 9:
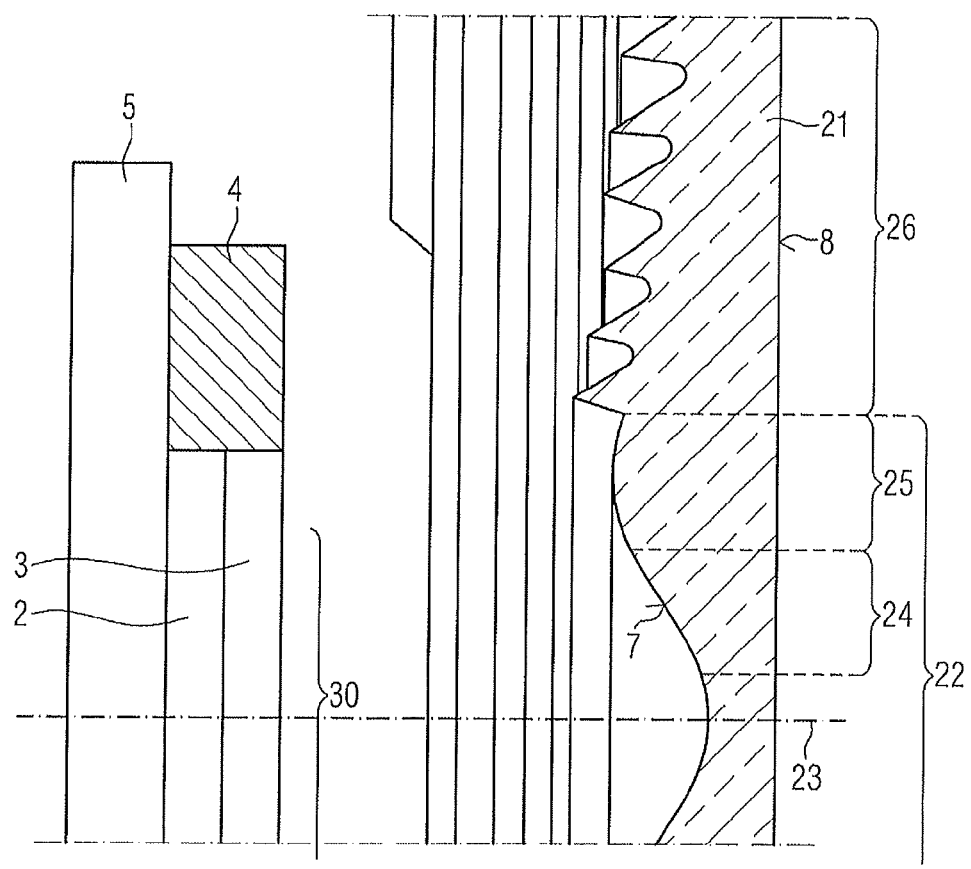
Figure 10:
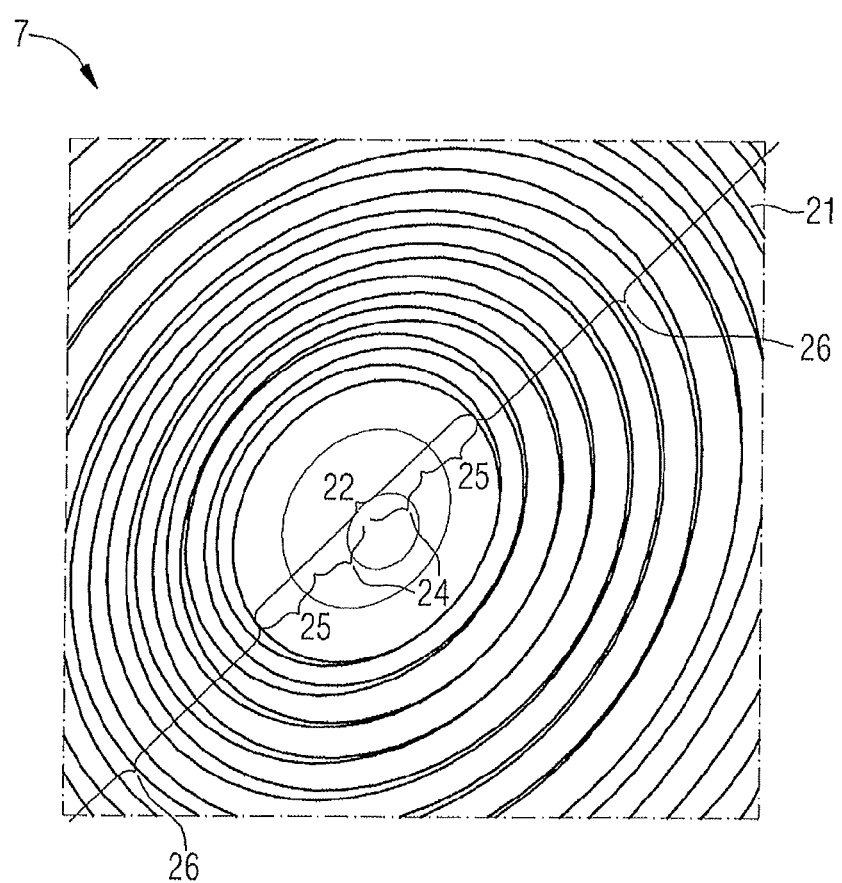
Figure 11A:
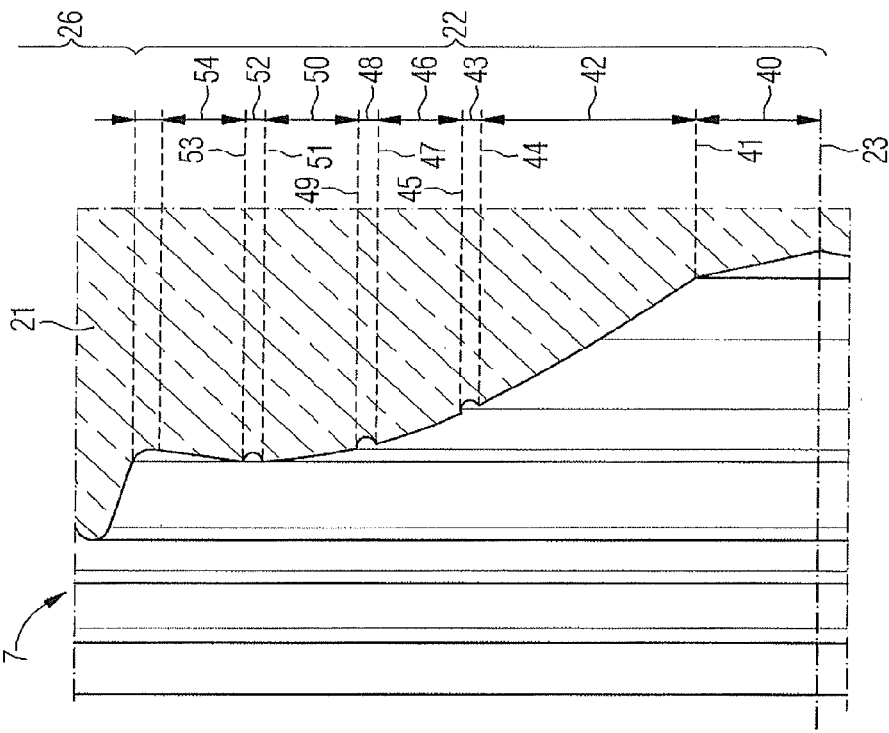
Figure 11:
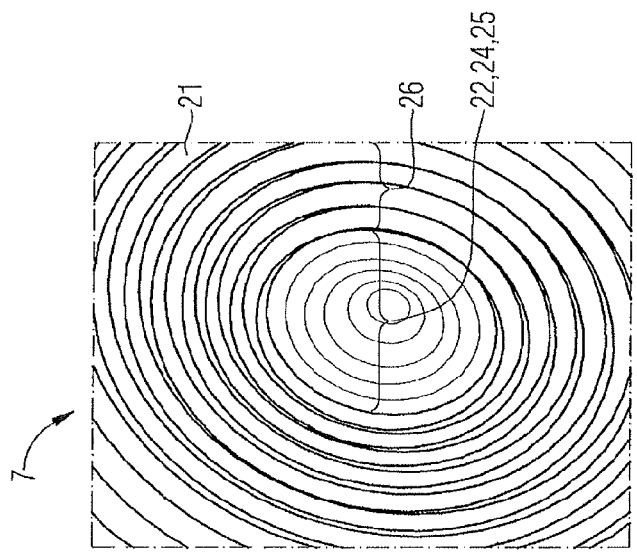
Figure 13A:
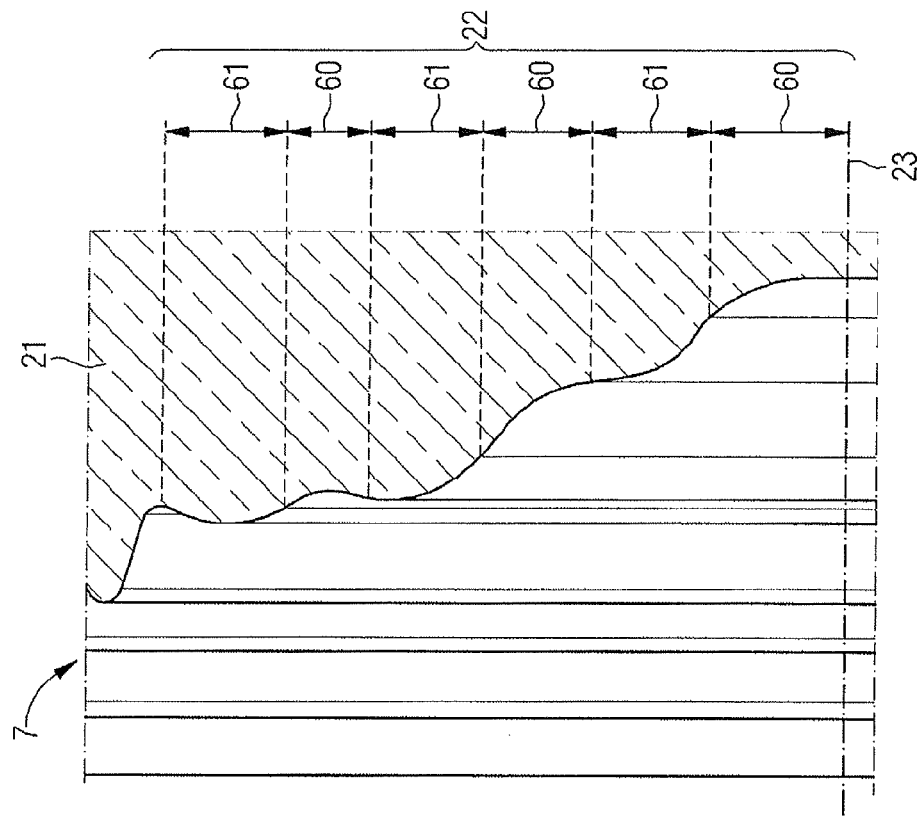
Figure 13:
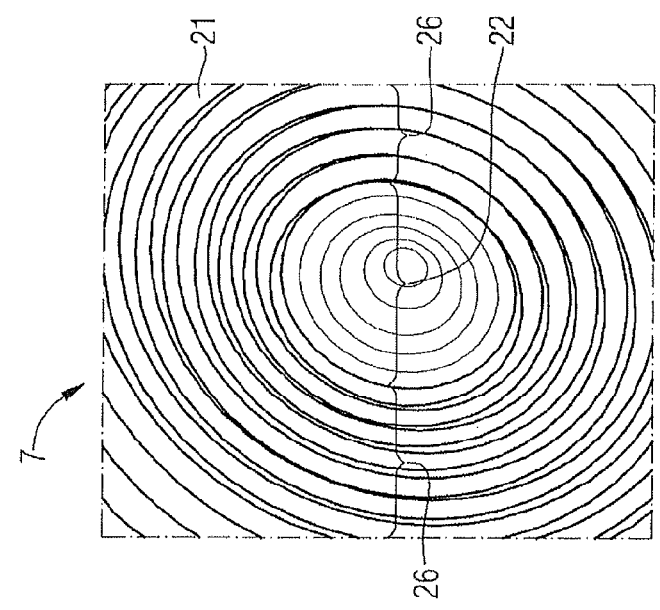
Figure 14:
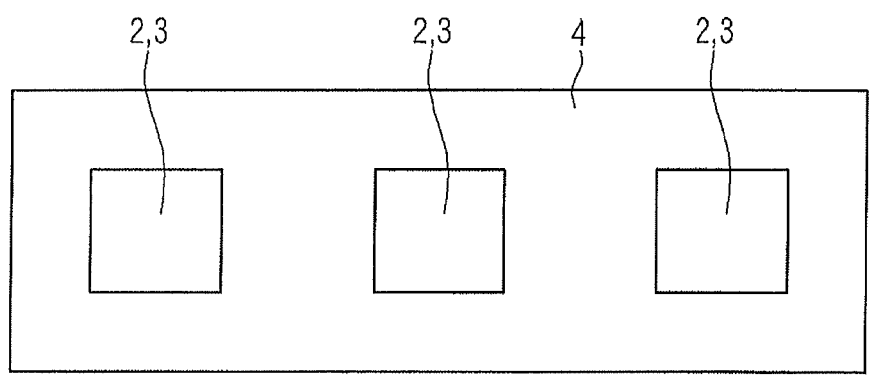
Figure 15:
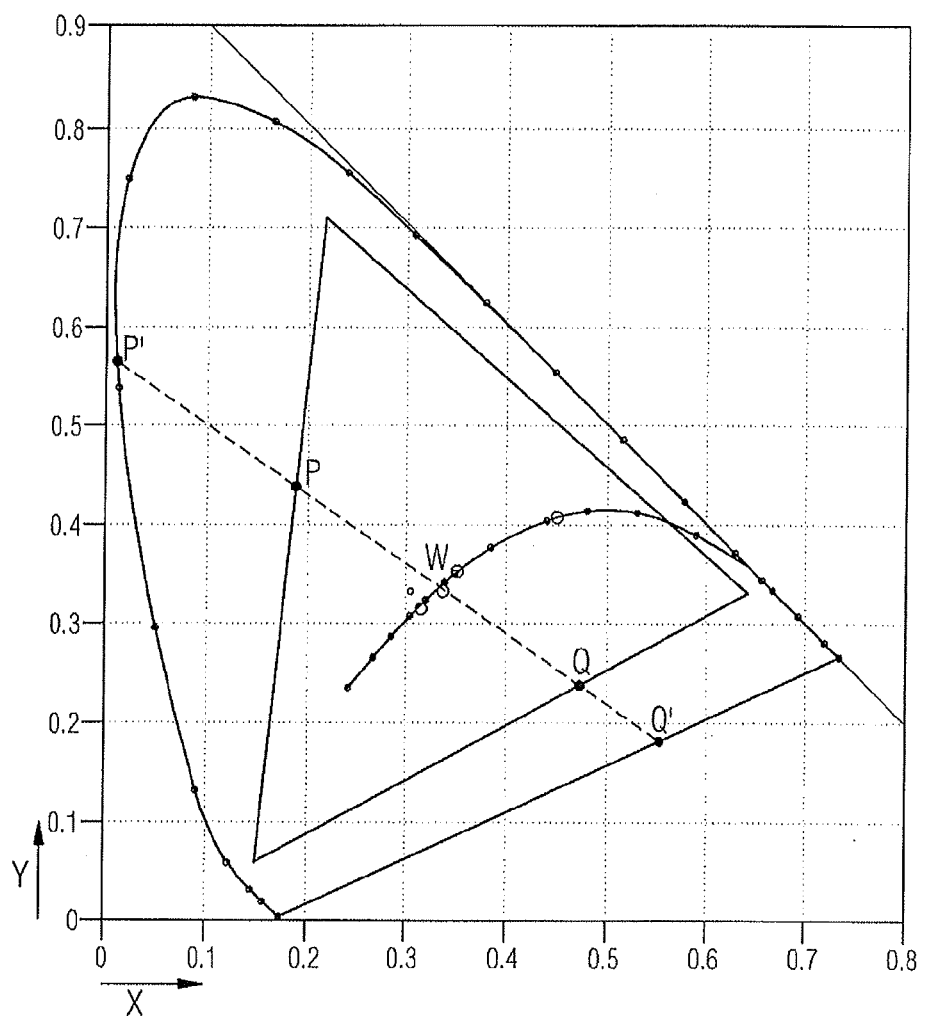

The above-described properties, features and advantages of this invention and the way in which they are achieved will become clearer and more clearly understood in association with the following description of the exemplary embodiments that are explained in greater detail in association with the drawings, wherein FIG. 1 shows an arrangement comprising a light emitting diode with a conversion element, FIG. 2 shows a schematic side view of an arrangement comprising a light emitting diode with a conversion element, FIG. 3 shows a diagram with characteristic curves for the reflectivities of the conversion element and of the edge region, FIG. 4 shows a second diagram with characteristic curves for the reflectivities of a further conversion element and of a further edge region, FIG. 5 shows a further embodiment of an arrangement comprising a light emitting diode, a conversion element and a structured edge region, FIG. 6 shows a diagram with characteristic curves for the reflectivities of the conversion element and of the structured edge region, FIG. 7 shows a further diagram with characteristic curves for the reflectivities of a conversion element and of a further edge region, FIG. 8 shows a schematic illustration of an arrangement comprising a lens, FIG. 9 shows an enlarged illustration of the lens, FIG. 10 shows a lens having continuous transitions between curvature sections, FIGS. 11 and 11A show schematic illustrations of a lens having step-like transitions between convex and concave curvatures, FIGS. 12 and 12A show a further embodiment of a lens, FIGS. 13 and 13A show schematic views of a lens, FIG. 14 shows a further embodiment of an arrangement comprising a plurality of light emitting diodes, FIG. 15 shows a schematic illustration of a chromaticity diagram, and FIGS. 16 and 16A show a further embodiment of a lens.

FIG. 1 shows a schematic plan view of an arrangement 1 comprising a light emitting diode 2. The light emitting diode 2 is produced from a semiconductor material, for example, and has a junction between a positively doped semiconductor material and a negatively doped semiconductor material with an active zone for generating electromagnetic radiation. A conversion element 3 is arranged above the light emitting diode 2. The conversion element 3 is designed to change the wavelength at least for part of the electromagnetic radiation generated by the light emitting diode 2. The conversion element 3 is surrounded by an edge region 4. The light emitting diode 2 can be designed in the form of a semiconductor chip on which a conversion element 3 is applied. The edge region 4 is formed e.g. by a substrate on which the light emitting diode 2 is arranged.

FIG. 2 shows a schematic side view of the arrangement 1, wherein the light emitting diode 2 is arranged on a substrate 5. The Conversion element 3 is arranged above the light emitting diode 2. A surface of the substrate 5 forms the edge region 4. Consequently, in the exemplary embodiment illustrated, the arrangement 1 constitutes an LED component. The substrate 5 can be designed for example in the form of a ceramic or a printed circuit board (PCB). A dye is applied on at least one part of the edge region 4 which surrounds the conversion element 3. The dye is preferably situated in a matrix composed of e.g. silicone, epoxy, high or low density polyolefins (for example polyethylene (PE)) or polypropylene, polyvinyl chloride, polystyrene, polyester, polycarbonate, polyethylene terephthalate, polyether sulfone, polyethylene naphthalate, polymethyl methacrylate, polyimide, polyether ketones, polyamides, for example polyphthalamides, polycyclohexylene dimethylene terephthalate (PCT). By way of example, the matrix material is liquefied by an elevated temperature before it is applied to the light emitting diode, i.e. the semiconductor chip. Furthermore, it is also possible to use a liquid matrix material that is cured, for example by the action of temperature or light, after being applied to the semiconductor chip. The matrix material can likewise be liquefied by dilution with a volatile solvent. The matrix with the dye can be applied to the substrate 5 e.g. by dispensing or spraying. Depending on the chosen embodiment, the conversion element can be applied to the entire substrate or to parts of the substrate. By way of example, regions of the substrate are separated by stop edges in order to prevent further progression of the matrix material.

Depending on the chosen embodiment, the dye can likewise be applied to the edge region without matrix material. By way of example, the dye can be administered in a volatile solvent (spin coating, spraying), wherein the matrix-free dye remains behind after evaporation. If appropriate, the dye can be fixed with a matrix. The dye can likewise be vapor-deposited onto the substrate by a vacuum process.

By way of example, as organic dyes and luminescent dyes, e.g. the following classes of substances can be used: acridine dyes, acridinone dyes, anthraquino dyes, anthracene dyes, cyanine dyes, dansyl dyes, squaryllium dyes, spiropyrans, boron-dipyrromethenes (BODIPY), perylenes, pyrenes, naphthalenes, flavins, pyrroles, porphyrins and the metal complexes thereof, diarylmethane dyes, triarylmethane dyes, nitro and nitroso dyes, phthalocyanine dyes and metal complexes of phthalocyanines, quinones, azo dyes, indophenol dyes, oxazines, oxazones, thiazines and thiazoles, xanthenes, fluorenes, flurones, pyronines, rhodamines, coumarins.

By way of example, transition metal oxides and rare earth oxides, sulfides, cyanides are appropriate as inorganic dyes. Moreover, depending on the chosen embodiment, the edge region 4 can be designed in the form of a liquid crystal in order to enable a desired reflectivity or emission of a desired color.

Depending on the chosen embodiment, a lens 6 can be fixed above the conversion element 3. The lens 6 can bear on the conversion element 3 or be held by a frame fixed to the substrate 5. The lens 6, in particular an underside 7 of the lens 6 facing the conversion element 3, is preferably fashioned such that the light reflected by the conversion element 3 and by the edge region 4 mixes additively within the lens. Depending on the chosen embodiment, the lens 6 can be dispensed with.

Depending on the chosen embodiment, the dye of the edge region 4 can terminate in a plane with the conversion element 3, i.e. be arranged at the same level. Moreover, depending on the chosen embodiment, the dye of the edge region 4, relative to the conversion element 3, can be arranged nearer to the surface of the substrate 5 or nearer to an underside 7 of the lens 6.

In this embodiment, as a result of an additive color mixing, an observer is given a color impression from the arrangement 1 that is independent of the body color of the conversion element. The underside 7 of the lens 6 can have for example a surface structure that leads to a scattering and, as a result, to a mixing of the light that is reflected by the conversion element 3 and by the edge region 4.

Depending on the chosen embodiment, it is possible to use a lens 6 in which regions on the underside 7 of the lens are provided by means of which the light which is incident on a central region of a top side 8 of the lens is deflected via the underside 7 laterally in the direction of the edge region 4. In a corresponding manner, the light reflected by the edge region 4 is deflected in the direction of the central region above the conversion element 3. In this way, color ranges that are reflected by the edge region 4 are imaged for an observer in the region of the conversion element. As a result, an observer is given a color impression that differs from the color impression of the conversion element 3.

The conversion element 3 is designed in such a way that the wavelength of electromagnetic radiation emitted by the light emitting diode 2 is at least partly altered. For this purpose, it is necessary for the conversion element to have a body color, i.e. for the conversion element to reflect light in a first color range. Consequently, upon impingement of light the conversion element generates a first color impression for an observer. By way of example, in the case of light emitting diodes which emit light having a blue wavelength, a conversion element having a yellow body color is used.

The edge region is fashioned or has a corresponding coloration such that the edge region 4 reflects light in a second color range. The second color range is chosen in a manner dependent on the first color range such that the second color range at least partly reflects a color range complementary to the first color range.

Depending on the chosen embodiment, the first and second color ranges constitute substantially complementary color ranges, in particular complementary colors, such that when the two color ranges are mixed, substantially white light arises. Depending on the chosen color ranges, when the two color ranges are mixed, light having a different color can also arise, which color is different, however, than the color of the conversion element. As a result of the provision of the conversion element which reflects light in a first color range and as a result of the provision of the edge region which reflects light in a second color range, an observer sees the arrangement 1 in a different color than would be generated by the body color of the conversion element. In this way, the visual impression of the arrangement can be adapted to a desired color, for example to a white color.

Depending on the chosen embodiment, the areas of the conversion element and of the edge region and/or the reflectivities of the conversion element and of the edge region and/or the reflected color ranges of the conversion element and of the edge region are chosen in such a way that a desired color impression is generated for an observer. Said color impression can constitute a white color, for example.

FIG. 3 shows characteristic curves 11, 12 of the reflectivities of the edge region 4 and of the conversion element 3 in a schematic diagram. The reflectivity in percent is plotted on the Y-axis. The reflectivity denotes the incident light power in relation to the reflected light power. The wavelength of the electromagnetic radiation is plotted on the X-axis. A first characteristic curve 11 designates the reflectivity of the conversion element 3. The first characteristic curve 11 exhibits a high reflectivity in the range of a wavelength above 530 nm. Moreover, there is an increased reflectivity in the range of a wavelength of below 430 nm. Consequently, the first characteristic curve 11 shows a conversion element which reflects light strongly in the yellow color range.

The second characteristic curve 12 shows the reflectivity of the edge region 4, which has a high reflectivity in the range below 630 nm. Moreover, the second characteristic curve 12 has an increasing reflectivity for wavelengths above 640 nm. The second characteristic curve 12 thus describes an edge region 4 which reflects light strongly in the range of the blue color spectrum in the range above 630 nm. The first color range of the conversion element, which reflects light strongly in the yellow color range, and the second color range of the edge region 4, which reflects light particularly in the blue color range, when mixed produce substantially a white color range. In this embodiment, the first color range is designed to be at least partly complementary to the second color range.

The mixing of the reflected portions of the conversion element 3 and of the edge region 4 can be supported for example by a correspondingly large distance between the observer and the arrangement 1 or by the provision of a lens that mixes the color ranges.

FIG. 4 shows a diagram with characteristic curves for the reflectivities of the conversion element and of the edge region of a further embodiment of an arrangement. The reflectivity is plotted in percent along the Y-axis and the wavelength is plotted along the X-axis. The reflectivity of the conversion element 3 is represented as a third characteristic curve 13 against the wavelength in FIG. 4. The reflectivity of the edge region 4 is depicted as a fourth characteristic curve 14 in FIG. 4. The third characteristic curve 13 substantially corresponds to an orange body color, i.e. the conversion element 3 reflects incident light in an orange color range. The fourth characteristic curve 14 describes an edge region 4 that reflects incident light substantially in a blue range complementary to the color range of the conversion element 3. Consequently, in this embodiment, too, upon mixing of the light reflected by the conversion element 3 and by the edge region 4, overall a white color impression results for an observer of the arrangement 1.

As already explained, the color ranges of the conversion element 3 and of the edge region 4 need not complement one another in a precisely complementary manner. It suffices if the second color range in which the edge region 4 reflects light, upon mixing with the first color range of the conversion element 3, brings about a color shift, such that for an observer the arrangement 1 generates a different color impression than the color impression of the conversion element 3 alone.

FIG. 5 shows a further embodiment of the arrangement 1, comprising a light emitting diode 2, above which a conversion element 3 is arranged. The conversion element 3 is surrounded by an edge region 4. In contrast to the embodiment in FIG. 1, the edge region 4 has two groups 15, 16 of partial areas which reflect incident light in different color ranges. In the embodiment illustrated, a multiplicity of partial areas 15, 16 are arranged in a manner distributed over the edge region 4. For simplified illustration, the partial areas of the first group are illustrated as white first partial areas 15. The partial areas of the second group are shown black in the illustration as second partial areas 16.

In the embodiment illustrated, the partial areas are designed in the form of squares. However, the partial areas 15, 16 can also have other shapes. The first group of partial areas reflects incident light in a third color range. The second group of partial areas reflects incident light in a fourth color range. The third and fourth color ranges are chosen in such a way that upon mixing of the first color range reflected by the conversion element 3 and of the third and fourth color ranges, a color impression that differs from the color impression of the conversion element 3 alone is generated for an observer.

By way of example, the third and fourth color ranges are chosen in such a way that a white color impression of the arrangement 1 with the conversion element 3 and the edge region 4 results for an observer. The third color range and/or the fourth color range are/is achieved by means of different dyes and/or pigments and/or driving of a liquid crystal display.

Depending on the chosen embodiment, it is also possible to provide more than two groups of partial areas in the edge region which reflect light in three different color ranges. Moreover, it is also possible, for example, for only part of the edge region 4 to be covered with colored partial areas.

FIG. 6 shows a diagram for the arrangement in FIG. 5, wherein the first characteristic curve 11 represents the reflectivity of the conversion element 3. The first characteristic curve 11 corresponds to the first characteristic curve 11 in FIG. 2. Consequently, the first characteristic curve 11 represents a conversion element 3 having a yellow body color. Furthermore, FIG. 6 illustrates a fifth and a sixth characteristic curve 17, 18 for the reflectivities of the partial areas of the first and second groups 15, 16. The fifth and sixth characteristic curves 17, 18 are designed in such a way that upon mixing of the light radiation reflected by the conversion element 3 and the edge region 4, a substantially white color impression is generated for an observer. Depending on the chosen embodiment, the fifth and sixth characteristic curves 17, 18 can also be designed in a different way in order to generate for an observer a color impression that is different than the color impression of the conversion element 3. The fifth characteristic curve 17 corresponds to a first dye, for example, and the sixth characteristic curve 18 corresponds to a second dye, for example. The first dye is arranged in the partial areas of the first group and the second dye is arranged in the partial areas of the second group.

FIG. 7 shows a diagram with characteristic curves for the reflectivities of a further embodiment of an arrangement in accordance with FIG. 5, wherein a conversion element 3 is surrounded by a structured edge region 4 having partial areas 15, 16 that are reflective in a differently colored fashion. In this embodiment, the first characteristic curve 13 has a reflectivity for the conversion element 3, which substantially has an orange body color. The first characteristic curve 13 corresponds to the characteristic curve 13 in FIG. 4. Moreover, a seventh characteristic curve 19 for the reflectivity of the partial areas of the first group 15 and an eighth characteristic curve 20 for the reflectivity of the partial areas of the second group 16 of the edge region 4 are also indicated in FIG. 7. The reflectivities of the partial areas 15, 16 of the edge region 4 are chosen in such a way that, despite the orange body color of the conversion element 3, upon mixing of the color ranges reflected by the conversion element 3 and by the edge region 4, a white color impression arises for an observer. Depending on the chosen embodiment, the characteristic curves for the reflectivity of the conversion element 3 and of the partial areas of the groups of the edge region 4 can also be chosen in such a way that a color impression altered from the body color of the conversion element 3 arises for an observer.

Preferably, a constant reflectivity over the entire range of visible light results from the reflectivities of the conversion element 3 and the reflectivities of the edge region 4. The reflectance and conversely also the absorption of the conversion element and of the edge region can be controlled by means of the area and by means of the concentration, i.e. the molecular extinction coefficient of the dye or of the pigments. In one exemplary embodiment, a dye such as e.g. an organic dye can also be mixed together with a pigment, e.g. titanium dioxide, in a matrix material such as e.g. silicone or an epoxy resin.

FIG. 8 shows a schematic illustration of a side view of an arrangement 1 with a second lens 21 arranged in front thereof. The arrangement 1 comprises a conversion element 3 having a square area. The square area has a side length L. The second lens 21 is designed in such a way that a light beam incident on a top side 8 of the second lens from outside is deflected, by means of a corresponding contour of the underside 7 of the second lens 21, from a central region 30 of the conversion element 3 laterally in the direction of the edge region 4. What is achieved in this way is that light incident on the arrangement from outside is deflected at least partly laterally onto the edge region 4. A large proportion of the incident light is thus also reflected back by the edge region 4 rather than by the conversion element 3. Moreover, the underside 7 of the second lens 21 in the region above the edge region 4 is designed in such a way that a light beam incident from outside impinges substantially perpendicularly on the edge region 4. At least a mixing of the color ranges reflected by the edge region 4 and by the conversion element 3 is thus achieved. Consequently, for an observer the arrangement 1 with the light emitting diode 2 not activated appears in a color range that differs from the body color, i.e. the first color range of the light reflected by the conversion element 3. Depending on the first and second color ranges with which the conversion element 3 and the edge region 4 reflect incident light, a corresponding color impression is generated for the observer. As explained above in the examples, the reflectivity of the conversion element 3 and the reflectivity of the edge region 4 can be designed in such a way that for the observer a white color impression arises in interaction with the second lens 21.

FIG. 9 shows, in an enlarged illustration, an excerpt from the arrangement in FIG. 8. On an inner side 7 facing the arrangement 1, the second lens 21 has a contour having a mixing region 22. The outer side 8 is designed as a planar area. The mixing region 22 is arranged directly above a central region 30 of the conversion element 3. The mixing region 22 is designed for example rotationally symmetrically with respect to a central axis 23. The central axis 23 is arranged centrally with respect to a center of the conversion element 3. Proceeding from the central axis 23, the surface of the inner side 7 of the second lens 21, as viewed in a radial direction, has a concave, ring-shaped region 24. The concave region 24 has a width of between 0.2 and 0.8 times the side length L of the conversion element. As viewed in a radial direction toward the outside, the concave region 24 is adjoined by a convex, ring-shaped region 25. The convex region 25 preferably has a width of between 0.2 and 0.8 times the side length of the conversion element. As viewed in a radial direction toward the outside, the convex region 25 is adjoined by an edge region 26. The edge region 26 serves for concentration and beam shaping of the light emitted by the conversion element 3. By way of example, the edge region 26 is designed in the form of a Fresnel structure. The inner side 7 is designed rotationally symmetrically with respect to the central axis 23. The concave region can have for example a radius of curvature of between $\frac{1}{4}$ and 1.5 times the side length L of the conversion element. The concave region 25 can have a radius of curvature of between for example $\frac{1}{3}$ and twice the side length L of the conversion element 3.

FIG. 10 shows a view of the inner side 7 of the further embodiment of the second lens 21 in FIG. 9, wherein the mixing region 22, comprising the concave region 24 and the convex region 25, has a continuous transition between the concave and convex curvatures.

FIG. 11 shows a further embodiment of the second lens 21, wherein the mixing region 22 comprises concave regions 24 and convex regions 25, wherein step-like transitions are provided between the concave and convex regions.

FIG. 11A shows a cross section through the second lens 21 in FIG. 11. The second lens 21 has on the underside 7 a surface structure designed rotationally symmetrically with respect to the central axis 23. FIG. 11A illustrates substantially a half of the mixing region 22 surrounded by an edge region 26. The mixing region 22 has a plurality of ring-shaped area sections arranged concentrically with respect to the central axis 23. A first ring area 40, which is arranged around the mid-point, undergoes transition to a second ring-shaped section 42 via a first edge 41. Both the first and the second ring-shaped sections 40, 42 are designed in convex fashion. The first edge 41 is designed as a ring-shaped edge. The second ring-shaped section 42 is adjoined by a third section 43. The third ring-shaped section 43 is designed as a concave ring area adjoining the second ring area 42 via a second edge 44. The third ring area 43 undergoes transition to a fourth ring area 46 via a third edge 45. The fourth ring area 46 is designed as a concave area. The fourth ring area 46 undergoes transition to a fifth ring area 48 via a fourth edge 47. The fifth ring area 48 is designed as a convex ring area. The fifth ring area 48 undergoes transition to a sixth ring area 50 via a fifth edge 49. The sixth ring area 50 is designed as a convex ring area. The sixth ring area 50 undergoes transition to a seventh ring area 52 via a sixth edge 51. The seventh ring area 52 is designed as a concave ring area. The seventh ring area 52 undergoes transition to an eighth ring area 54 via a seventh edge 53. The eighth ring area 54 is designed as a convex ring area. Each ring area is arranged rotationally symmetrically with respect to the central axis 23.

The width of the concave ring areas is significantly greater than the width of the convex ring areas. The radius of curvature of the convex ring areas is less than the radius of curvature of the concave ring areas.

FIG. 12 shows a further embodiment of a second lens 21 with a view of the underside 7. FIG. 12A shows a partial cross section through the second lens 21 in FIG. 12. In this embodiment, the radii of curvature of the individual sections of the concave ring areas are designed to be smaller than in FIG. 11A.

FIG. 13 shows a view of an underside 7 of a second lens 21, wherein concave and convex ring areas alternate in the mixing region 22. FIG. 13A shows a partial cross section through the second lens 21 in FIG. 13. It can clearly be discerned here that proceeding from the central axis 23 in a radial direction ring areas adjoin one another which are arranged concentrically with respect to the central axis 23 and alternately constitute a convex and a concave ring area 60, 61 on the inner side 7 of the second lens 21.

FIG. 14 shows a further embodiment of an arrangement 1, wherein provision is made of a plurality of light emitting diodes 2 with conversion elements 3 surrounded by an edge region 4. The conversion elements 3 and the edge region 4 have corresponding reflectivities, such that, even without a lens, when an observer is at a corresponding distance, mixing of the first and second color ranges reflected by the conversion elements 3 and the edge region 4 generates for the observer a visual color impression that is different than the visual color impression of the conversion elements 3 alone. By way of example, the visual color impression can constitute a white color. However, visual color impressions of the arrangement 1 can also be generated depending on the chosen embodiment.

The arrangement 1 is suitable for example as a device for lighting for rooms and/or buildings.

The arrangement 1 constitutes for example an LED module having a plurality of LEDs. In this case, a multiplicity of semiconductor chips are mounted on a substrate (e.g. chip-on-board technology). The interspaces can be filled with a complementary reflector. These LED modules can be used for general lighting. In this case, they are fitted relatively far away from the observer, e.g. on the ceiling. At a sufficient distance from the observer, the observer can no longer distinguish the individual regions, i.e. the conversion elements and the edge region, and the module appears in a mixed color which constitutes a white color, for example. Depending on the chosen embodiment, an additional lens for mixing the light reflected by the conversion elements and the edge region can be provided in the case of this design as well.

Depending on the chosen embodiment, by way of example, a conversion element having a red body color and an edge region having a blue body color can be used, such that a mixing of these two colors generates a pink color impression of the arrangement.

Complementary colors can be represented for example with the aid of a two-dimensional CIE standard chromaticity diagram, illustrated in FIG. 15. In the CIE standard chromaticity diagram, a third component z, e.g. the color blue for every point of the chromaticity diagram, is determined computationally from the other two colors red and green by means of the relationship $x+y+z=1$. The horseshoe-shaped area of possible colors in the CIE standard chromaticity diagram is plotted on a coordinate system on which x and y components (of the CIE-standardized theoretical primary colors x (red), y (green) and z (blue)) of an arbitrary color P can be read directly. The central reference point of the standard chromaticity diagram is a white point W. The white point W represents the point at which all three colors each have ⅓ (x, y and z=0.333 . . . ) color proportion. Proceeding from the white point W, all complementary colors can be represented on a straight line through the white point W. The complementary colors lie on a straight line through the white point at opposite sides in relation to the white point and are each at the same distance from the white point W. In the example illustrated, P and Q, and P' and Q', are complementary colors. Arbitrary straight lines through the white point W can be used for determining complementary colors. Complementary color ranges can also be determined in a corresponding manner.

FIG. 16 shows a view of a further embodiment of a second lens 21. FIG. 16A shows a cross section through the second lens 21 in FIG. 16. In this embodiment, further ring areas 62, 63 alternate in a radial direction proceeding from a central area, wherein the individual further ring areas 62, 63 are substantially designed as planar ring areas. The individual further ring areas are arranged concentrically with respect to a central axis 23 and merge into one another via rounded ring edges 64. Ring areas which are adjacent in a radial direction have surfaces having different inclination angles relative to the plane of the second lens 21. Moreover, the thickness of the second lens 21 increases stepwise in a radial direction proceeding from the central axis 23. A stepped structure is thus achieved, which is likewise achieved for deflection and mixing of the light reflected by the conversion element 3 and the edge region 4. The inclination angles of the first further ring areas 62 are in the range of between plus 30 and plus 40° in relation to a top side 8 of the second lens 21. The second further ring areas 63 have an inclination of minus 10° with respect to the plane of the top side 8 of the second lens 21. Proceeding from a planar central region 65, a first and second further ring area 62, 63 respectively alternate. Along the first further ring area, the thickness of the second lens in each case increases in a radial direction. Along the second further ring area 63, the thickness of the second lens decreases again in a radial direction. Since the first further ring areas 62 are inclined in a positive direction more greatly than the second further ring areas 63 are inclined in a negative direction, an increase in the thickness of the lens in a radial direction from the inside toward the outside is achieved. Depending on the chosen embodiment, the first further and the second further ring areas 62, 63 can also have other inclination angles with respect to the plane of the second lens 21, in particular with respect to the surface 8. By way of example, the first and the second further ring areas 62, 63 can also have positive inclination angles with respect to the plane of the second lens 21, in particular with respect to the surface 8.

Various possible examples are described below: one advantage of the arrangement described is that, with the light emitting diode not activated, the color range reflected by the arrangement is different than the color range reflected by the conversion element. This is achieved by virtue of the fact that an edge region is provided which at least partly surrounds the conversion element and is designed in such a way that the edge region reflects light in a second color range. In this case, the second color range is chosen in relation to the first color range in such a way that the second color range at least partly has a color range complementary to the first color range.

What is achieved in this way is that the arrangement comprising conversion element and edge region reflects incident light, in particular ambient light, into a color range that is different than the first color range of the conversion element. The second color range is designed in such a way that for an observer the first color range of the conversion element is at least attenuated, in particular is shifted in the direction of a desired color. Preferably, a white color can be provided as the desired color. This is achieved by virtue of the fact that the first and second color ranges have at least partly complementary color ranges. Consequently, the arrangement comprising conversion element and edge region appears substantially in a white color for an observer. Depending on the chosen embodiment, the two color ranges can be chosen in such a way that a purely white color is reflected by the arrangement comprising conversion element and edge region or the light reflected by the arrangement has at least a large color proportion of white light.

In a further embodiment, the first and second color ranges constitute substantially complementary color ranges, in particular complementary colors. What is thereby achieved is that the arrangement comprising conversion element and edge region appears substantially as a white area for an observer when the light emitting diode is not emitting light.

This design affords the advantage that the arrangement scarcely becomes apparent or does not become apparent in terms of color and therefore does not disturb an observer. Depending on the brightness, the arrangement comprising conversion element and edge region can also appear as a gray-white area for an observer.

What is achieved by the use of a white color impression of the arrangement is that the arrangement appears neutral for an observer and is not significant in terms of the visual impression. A disturbing visual impression of the arrangement can thus be avoided. This is advantageous, for example, if the arrangement is arranged in a building in front of a white background. The arrangement can likewise be part of a device such as e.g. a cellular phone. In this use, too, it can be advantageous to alter, in particular to suppress, the visual impression of the conversion element. Preferably, a white visual impression of the arrangement may appear pleasant to an observer in the case of a cellular phone. By way of example, the arrangement comprising the light emitting diode can be designed as a flashlight in the case of a cellular phone.

Conversion elements are used, for example, to shift blue light of a light emitting diode in the direction of white light using an orange conversion element. However, the orange color impression of the conversion element which is generated upon inactivity of the light emitting diode and upon incidence of light is perceived as visually disturbing.

In a further embodiment, the areas of the conversion element and of the edge region and/or the reflected color ranges of the conversion element and of the edge region are designed in such a way that the light reflected by the conversion element and by the edge region has a white color range. What is achieved in this way is that the original color of the conversion element is attenuated and overall the arrangement appears in a color altered from the color of the conversion element, in particular in a white color, for an observer. Depending on the chosen embodiment, the overall impression of the arrangement can also appear in a different color than the white color by means of a corresponding adaptation of the areas and/or of the reflectivities and/or of the color ranges. In this way, the arrangement can be adapted to a desired ambient color, for example to a color of a building wall and/or to the color of a housing, without adversely affecting the function of the conversion element.

This arrangement results in an improved color impression, in particular a white impression of the arrangement, in particular of an arrangement comprising a light emitting diode in the unoperated state. Moreover, in comparison with the prior art an increased overall efficiency of the luminous efficiency is achieved by means of the arrangement described. Furthermore, different colors can be generated depending on the desired color impression of the arrangement. In this way, the arrangement can be adapted to the color of an environment.

By virtue of the arrangement described, it is also possible to use colors or dyes for the edge region which degrade rapidly upon irradiation with light of the light emitting diode, since the light of the light emitting diode scarcely impinges on them.

By virtue of the use of a second color range which is not white and at least partly has a color range complementary to the first color range, it is possible to shift the overall color impression of the arrangement comprising the conversion element and the edge region in the direction of a desired color.

In a further embodiment, the edge region is subdivided into at least two partial areas, wherein the two partial areas reflect light with different color ranges. The size of the partial areas and/or the color ranges and/or the reflectivities of the partial areas are designed in such a way that the light reflected by the edge region at least partly has a color range complementary to the first color range. Consequently, it is not necessary for the entire edge region to reflect light in a color range, rather it is possible to provide partial areas on the edge region which reflect incident light with different color ranges. An improved adaptation of a desired color impression of the arrangement can thereby be achieved.

By way of example, the edge region can be subdivided into a multiplicity of partial areas, wherein the partial areas are subdivided into two groups, for example. Each group of partial areas reflects the incident light in a specific partial color range. By way of example, the partial areas can be arranged in the form of squares in the form of a checkered pattern on the edge region.

In a further embodiment, the arrangement comprises a plurality of light emitting diodes, for example, which are arranged alongside one another and are surrounded by a common edge region. In this embodiment, too, the conversion elements and the edge regions are designed in such a way that for an observer the arrangement reproduces a different visual color impression than the color impression of the conversion element. This arrangement can be used for example as a luminaire for lighting a room in a building.

In this case, the areas of the conversion elements and the area of the edge region are chosen in such a way that for an observer at a predefined distance the entire arrangement generates a colored impression which is different than the color of the conversion element, wherein, for example, a white color impression is generated for the observer. The color impression of the arrangement can be adapted to the color of the wall on which the luminaire is fixed.

In a further embodiment, a lens is provided above the conversion element. In a further embodiment, the lens is designed in such a way that the light reflected by the conversion element and by the edge region is mixed. Consequently, in this simple embodiment, the lens supports an alteration of the visual color impression of the arrangement away from the color impression of the conversion element.

In one embodiment, the lens is constructed such that upon incidence of light from outside on the lens, the light is deflected at least partly, in particular completely, from a central region of the converter in the direction of the edge region. What is achieved in this way is that light incident from outside scarcely impinges or does not impinge at all on the conversion element, but rather impinges on the edge region. As a result, the light incidence is directed in such a way that more light is reflected by the edge region than by the central region of the conversion element. In this way, an increased proportion of the second color range is reflected back via the lens. As a result, for example, the edge region can be designed with a smaller area or with a lower reflectivity.

Consequently, when the light emitting diode is not active, a visual color impression that is different than the color of the conversion element is generated for an observer. Consequently, the arrangement of the lens improves the mixing of the reflected color range of the conversion element with the reflected color range of the edge region.

The use of the lens can be advantageous in particular when the arrangement is provided in a device, in particular in a cellular phone, in order to concentrate the light emitted by the light emitting diode.

Depending on the chosen embodiment, the edge region can be designed in the form of a liquid crystal. In a further embodiment, the edge region can comprise a dye or color pigments that define the second color range for the light reflected by the edge region.

In one embodiment, the lens can have a surface structure constituting at least one convex and one concave ring-shaped surface structure. As a result, a simple structure is provided with which light impinging on the lens from outside is deflected from a central region in the direction of the edge region.

In one simple embodiment, the first color range can substantially constitute a yellow color range and the second color range can substantially constitute a blue color range. Conversion elements having a yellow body color are used, for example, to shift blue light of a light emitting diode in the direction of a white color. What is achieved by the arrangement of an edge region with a substantially blue color range is that the visual color impression of the arrangement lies in a white color range.

In a further embodiment, a conversion element is used which has a body color in the orange color range. In this embodiment, an edge region is used which has a color range substantially in the green color range. As a result of the mixing of the orange color range with the green color range, once again a substantially white color impression is generated for an observer.

In a further embodiment, the concave and convex ring-shaped surface structures merge into one another continuously. In a further embodiment, the concave and convex surface structures merge into one another discontinuously via steps and/or edges.

In a further embodiment, the lens has ring-shaped further surface structures, wherein the ring-shaped further surface structures are designed as planar ring areas, wherein the further surface structures are arranged concentrically with respect to a central axis, wherein adjacent ring areas have different inclinations in relation to the plane of the lens and constitute a surface of the lens which is stepped in a radial direction. Efficient light guiding is thus achieved in order to achieve a mixing of the light reflected by the conversion element and by the edge region.

In a further embodiment, the lens has a Fresnel structure in an outer edge region. The Fresnel structure preferably begins in a boundary region between the conversion element and the edge region. Concentration of the light emitted by the light emitting diode is achieved by means of the Fresnel structure.

Although the invention has been more specifically illustrated and described in detail by means of the preferred exemplary embodiment, the invention is nevertheless not restricted by the examples disclosed, and other variations can be derived therefrom by a person skilled in the art, without departing from the scope of protection of the invention.

LIST OF REFERENCE SIGNS

1 Arrangement
2 Light emitting diode
3 Conversion element
4 Edge region
5 Substrate
6 Lens
7 Underside
8 Top side
11 First characteristic curve
12 Second characteristic curve
13 Third characteristic curve
14 Fourth characteristic curve
15 First partial area
16 Second partial area
17 Fifth characteristic curve
19 Seventh characteristic curve
20 Eighth characteristic curve
21 Second lens
22 Mixing region
23 Central axis
24 Concave ring region
25 Convex ring region
26 Edge region
30 Central region
40 First ring area
41 First edge
42 Second ring area
44 Second edge
43 Third ring area
45 Third edge
46 Fourth ring area
47 Fourth edge
48 Fifth ring area
49 Fifth edge
50 Sixth ring area
51 Sixth edge
52 Seventh ring area
53 Seventh edge
54 Eighth ring area
60 Convex ring area
61 Concave ring area
62 First further ring area
63 Second further ring area
64 Ring edge
65 Central region

The invention claimed is:

1. An arrangement for generating light comprising a light emitting diode, comprising a conversion element and arranged on a substrate, wherein the conversion element is arranged on the light-emitting diode and provided for at least partly changing the wavelength of the electromagnetic radiation emitted by the light emitting diode, wherein the conversion element is designed in such a way that light impinging on the conversion element from outside in a first color range is reflected, wherein the conversion element is at least partly surrounded by an edge region arranged on the substrate beside the conversion element, wherein the edge region is designed in such a way that light impinging on the edge region in a second color range is reflected, wherein the second color range at least partly has a color range complementary to the first color range.

2. The arrangement as claimed in claim 1, wherein the first and second color ranges constitute complementary color ranges.

3. The arrangement as claimed in claim 1, wherein at least one of an area of the conversion element and an area of the edge region, a reflectivity of the conversion element and a reflectivity of the edge region, or the first and second color ranges are designed such that the light reflected by the conversion element and by the edge region constitutes a white color range.

4. The arrangement as claimed in claim 1, wherein the edge region is subdivided into at least two partial areas, wherein the two partial areas reflect incident light with different further color ranges, wherein at least one of the partial areas or the further color ranges are designed in such a way that the light reflected by the edge region at least partly has a second color range complementary to the first color range.

5. The arrangement as claimed in claim 4, wherein the edge region is subdivided into a multiplicity of partial areas, wherein the partial areas are subdivided at least into two groups, wherein each group of partial areas reflects incident light at least partly in a different further color range.

6. The arrangement as claimed in claim 4, wherein the edge region is subdivided into a multiplicity of partial areas, wherein the partial areas are subdivided at least into two groups, wherein each group of partial areas reflects incident light at least partly in a different further color range, wherein at least one of a total area of each group of partial areas, a reflectivity of the partial areas of the groups, or the further color ranges are designed such that the edge region reflects incident light in a second color range at least partly complementary to the first color range.

7. The arrangement as claimed in claim 1, wherein the edge region is designed as liquid crystal or the edge region comprises a dye or color pigments.

8. The arrangement as claimed in claim 1, wherein a lens is provided above the conversion element, wherein the lens is designed in such a way that the light reflected by the conversion element and by the edge region is mixed.

9. The arrangement as claimed in claim 8, wherein the lens is constructed such that light impinging on the lens from outside is deflected by a central region of the conversion element at least partly laterally in the direction of the edge region.

10. The arrangement as claimed in claim 8, wherein the lens is constructed such that light impinging on the lens from outside is deflected by a central region of the conversion element at least partly laterally in the direction of the edge region, wherein the lens, on one side, in particular on the inner side facing the conversion element, has at least ring-shaped surface structures having at least one convex or one concave curvature.

11. The arrangement as claimed in claim 10, wherein the first color range comprises a yellow color range, and wherein the second color range comprises a blue color range, or wherein the first color range comprises a magenta-colored color range, and wherein the second color range comprises a green color range.

12. The arrangement as claimed in claim 10, wherein the surface structures comprise a concave and a convex ring-shaped surface structure, wherein the ring-shaped surface structures merge into one another continuously or merge into one another discontinuously via steps or edges.

13. The arrangement as claimed in claim 11, wherein the surface structures comprise a concave and a convex ring-shaped surface structure, wherein the ring-shaped surface structures merge into one another continuously or merge into one another discontinuously via steps or edges.

14. The arrangement as claimed in claim 10, wherein a mid-point of the concave or convex ring-shaped surface structure is arranged above a center of the conversion element.

15. The arrangement as claimed in claim 11, wherein a mid-point of the concave or convex ring-shaped surface structure is arranged above a center of the conversion element.

16. The arrangement as claimed in claim 8, wherein the lens is constructed such that light impinging on the lens from outside is deflected by a central region of the conversion element at least partly laterally in the direction of the edge region, wherein the lens, on one side, in particular on the inner side facing the conversion element, has at least ring-shaped further surface structures, wherein the ring-shaped further surface structures are designed as planar ring areas, wherein the further surface structures are arranged concentrically with respect to a center axis, wherein adjacent ring areas are arranged in a manner inclined differently in a radial direction with respect to a plane of the lens and thus constitute a surface of the lens that is stepped in a radial direction.

17. The arrangement as claimed in claim 11, wherein the lens, on one side, in particular on the inner side facing the conversion element, has at least ring-shaped further surface structures, wherein the ring-shaped further surface structures are designed as planar ring areas, wherein the further surface structures are arranged concentrically with respect to a center axis, wherein adjacent ring areas are arranged in a manner inclined differently in a radial direction with respect to a plane of the lens and thus constitute a surface of the lens that is stepped in a radial direction.

18. The arrangement as claimed in claim 10, wherein the surface structures are surrounded by a Fresnel structure in an outer edge region.

19. The arrangement as claimed in claim 11, wherein the surface structures are surrounded by a Fresnel structure in an outer edge region.

20. An arrangement for generating light comprising a light emitting diode, comprising a conversion element and arranged on a substrate, wherein the conversion element is arranged on the light-emitting diode and provided for at least partly changing the wavelength of the electromagnetic radiation emitted by the light emitting diode, wherein the conversion element is designed in such a way that light impinging on the conversion element from outside in a first color range is reflected, wherein the conversion element is at least partly surrounded by an edge region arranged on the substrate beside the conversion element, wherein the edge region is designed in such a way that light impinging on the edge region in a second color range is reflected, wherein the second color range at least partly has a color range complementary to the first color range, wherein at least one of an area of the conversion element and an area of the edge region, a reflectivity of the conversion element and a reflectivity of the edge region or the first and second color ranges are designed such that the light reflected by the conversion element and by the edge region constitutes a white color range.

21. An arrangement for generating light comprising a light emitting diode, comprising a conversion element and arranged on a substrate, wherein the conversion element is provided for at least partly changing the wavelength of the electromagnetic radiation emitted by the light emitting diode, wherein the conversion element is arranged on the light-emitting diode and designed in such a way that light impinging on the conversion element from outside in a first color range is reflected, wherein the conversion element is at least partly surrounded by an edge region arranged on the substrate beside the conversion element, wherein the edge region is designed in such a way that light impinging on the edge region in a second color range is reflected, wherein the second color range at least partly has a color range complementary to the first color range, wherein a lens is provided above the conversion element, wherein the lens is designed in such a way that the light reflected by the conversion element and by the edge region is mixed.

* * * * *